April 7, 1942.  E. WILDHABER  2,278,576
METHOD OF RELIEVING GEAR CUTTERS
Filed Aug. 8, 1938  6 Sheets-Sheet 1

INVENTOR
Ernest Wildhaber
BY
ATTORNEY

April 7, 1942.  E. WILDHABER  2,278,576
METHOD OF RELIEVING GEAR CUTTERS
Filed Aug. 8, 1938   6 Sheets-Sheet 2

Fig. 4
Fig. 3
Fig. 5
Fig. 6
Fig. 7
Fig. 8

INVENTOR
Ernest Wildhaber
BY
ATTORNEY

April 7, 1942.  E. WILDHABER  2,278,576
METHOD OF RELIEVING GEAR CUTTERS
Filed Aug. 8, 1938  6 Sheets-Sheet 3

INVENTOR
Ernest Wildhaber
BY
ATTORNEY

April 7, 1942.  E. WILDHABER  2,278,576
METHOD OF RELIEVING GEAR CUTTERS
Filed Aug. 8, 1938  6 Sheets-Sheet 5

INVENTOR
Ernest Wildhaber
BY
ATTORNEY

Patented Apr. 7, 1942

2,278,576

UNITED STATES PATENT OFFICE 2,278,576

METHOD OF RELIEVING GEAR CUTTERS

Ernest Wildhaber, Brighton, N. Y., assignor to Gleason Works, Rochester, N. Y., a corporation of New York Application August 8, 1938, Serial No. 223,584

16 Claims. (Cl. 51—288)

The present invention relates to gear cutting tools and particularly to gear cutting tools that have side-cutting edges of curved profile. More specifically the invention relates to disc type gear cutters for cutting straight tooth gears by continuous rotation of the cutter and intermittent indexing of the gear blank and constructed according to the principles of my prior application, Serial No. 181,177, filed December 22, 1937.

One object of the invention is to provide a method for relieving the side surfaces of cutters of curved profile and particularly of circular arcuate profile which will produce cutters that will be accurate and have correctly shaped side cutting edges throughout their whole life.

A further object of the invention is to provide a method for accurately relieving the blades of a cutter for cutting tapered gears such as described in my prior application, in which successive blades may be produced that have side cutting edges of the same radii but with centers of curvature displaced from one another.

Still another object of the invention is to provide a simple and easily-constructed machine for carrying out the relieving method.

A still further object of the invention is to provide a cutter of improved form for cutting gears according to the principles of my prior application above mentioned.

Other objects of the invention will be apparent hereinafter from the specification and from the recital of the appended claims.

In the drawings:

Fig. 3 is a diagrammatic view illustrating the relative positions of corresponding side profiles of three cutting blades of the cutter;

Fig. 4 is a diagrammatic plan view of a relieving machine built according to one embodiment of the present invention;

Figs. 5 and 6 are fragmentary developed views, respectively, of cutters made according to two different embodiments of the invention;

Fig. 7 is a fragmentary plan view and Fig. 8 a fragmentary sectional view of a cutter made according to one embodiment of the invention;

In my prior application above referred to, I have illustrated how a pair of gears may be cut by employing for the cutting of each of them a rotary disc cutter, which has a plurality of cutting blades arranged part-way only around its periphery with a gap between the last and first blades. The cutters have side-cutting edges of concave profile. Each is rotated continuously in engagement with a gear blank and, during the cutting of each tooth space of the blank, is fed across the face of the blank in time with its rotation so that different blades of the cutter cut at different points along the length of the tooth space. The blank is held stationary during cutting but when the gap in the cutter is abreast of the blank, the blank is indexed. For cutting straight tooth bevel gears, the corresponding side-cutting edges of successive blades of the cutter have their centers of curvature progressively displaced so that they will cut tooth spaces in the gear blank which will taper in height and thickness from end to end.

While the present invention relates specifically to cutters for cutting gears according to the invention of my prior application and to the relieving of such cutters, it applies, also, to other forms of milling cutters with concave side cutting edges of substantially constant profile curvature, as, for instance, disc milling cutters commonly employed for rough-cutting bevel gears in quantity. More particularly it relates to cutters having side-cutting edges of substantially circular arcuate form where the radii of the corresponding side cutting edges of different blades are equal.

In the relieving method of the present invention, a milling cutter or grinding wheel is employed as the relieving tool and has an active profile of curved shape, preferably of circular shape. In the present preferred embodiment of the invention, the relieving tool represents a sphere having a radius of curvature equal to that to be produced on the side surface of the blades which are to be relieved.

The relieving operation is effected by rotating the grinding wheel or other relieving tool in engagement with the cutter while rotating the cutter on its axis and simultaneously producing a relative motion between the relieving tool and the cutter in a direction perpendicular to the cutter axis. Preferably this last motion is effected, as in known relieving processes, by a cam and comprises a movement of the cutter toward and from the grinding wheel for each blade of the cutter.

Where a cutter of the type described in my prior application for cutting tapered gears is to be relieved, an advancing motion is imparted to the grinding wheel in addition to the other motions. This advancing motion is in a direction tangent to the curved profiles of the blades and may be intermittent, that is, it may be effected between relieving of successive blades, or it may be continuous. The advancing motion causes the center of the sphere represented by the relieving tool to be displaced in the direction of the tangent so that successive blades will have the same radii of curvature but centers of curvature that are displaced from one another.

Blades made according to this invention have properly relieved side surfaces and will have correct cutting profiles throughout their whole life despite repeated sharpenings.

In addition to the improved accuracy so obtained, the invention also includes certain detail improvements in cutter construction as, for instance, the provision of supplemental relief on the sides of the cutter blades at their rear ends to provide the maximum life for the blades while still enabling the side surfaces of one blade to be ground without interference between the grinding wheel and the blade of the cutter following that being ground. The present invention also contemplates the manufacture of cutters with staggered cutting edges whereby the maximum life may be obtained while providing smooth cutting action.

Figure 1:
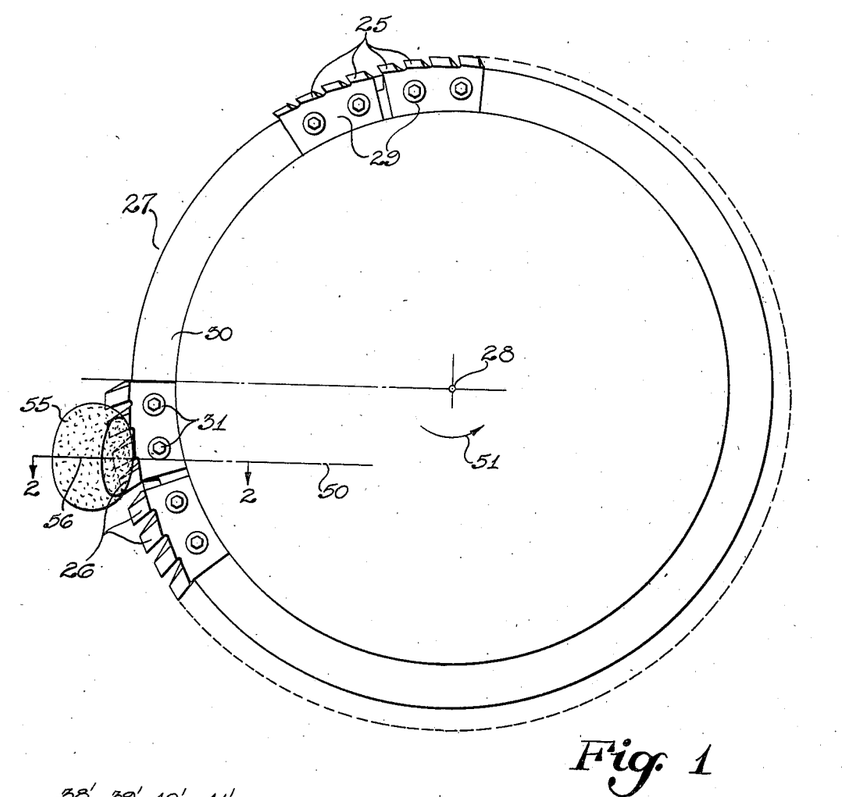
Fig. 1 is a side elevation of a cutter made according to one embodiment of this invention and illustrating diagrammatically the method of relieving this cutter according to one modification of the invention.

Fig. 1 shows a cutter for cutting tapered gears made according to one embodiment of this invention. It is provided with a plurality of roughing blades 25 and a plurality of finishing blades 26. Both the roughing blades and the finishing blades are of gradually increasing height according to the principles of my prior application. There is a peripheral gap 27 provided between the last finishing blade and the first roughing blade.

In the embodiment of the invention illustrated, the cutter is of the segmental type, that is, it comprises a plurality of cutting segments 29 each of which is formed with a plurality of cutting blades or teeth that are integral with one another. The cutting segments are secured to the rotary cutter head 30 by screws or bolts 31.

The side surfaces of the cutting blades are of circular arcuate profile. This is clearly illustrated in Fig. 2, where one of the finishing blades of the cutter is shown in section. The opposite side surfaces of this blade are curved along circular arcs 35 and 35', respectively. 36 denotes the center of the arc 35 and 37 its radius. The opposite side surfaces of the blade are ordinarily curved along arcs 35 and 35' of equal radii 37 and 37' and the centers 36 and 36' of these arcs are disposed symmetrically with relation to a median plane 57 of the cutter.

For tapered gears the radii 36, or 36' of a side surface is the same on all blades but the position of the profile center changes from blade to blade. Thus a blade further ahead of the blade shown in Fig. 2 may have a profile center at 38 and another blade still further ahead may have a profile center at 39. The various profile centers 36, 38, 39, etc., are all located on a straight line 40 which is parallel to a basic profile line 41 that is tangent to the successive profile arcs. The basic profile line for the opposite side cutting edges of the blades is designated at 41' and the centers 38', 39', etc., of different opposite side cutting edges are all located on the line 40' parallel to the line 41'.

Figures 3, 4, 5, 6, 7, 8:
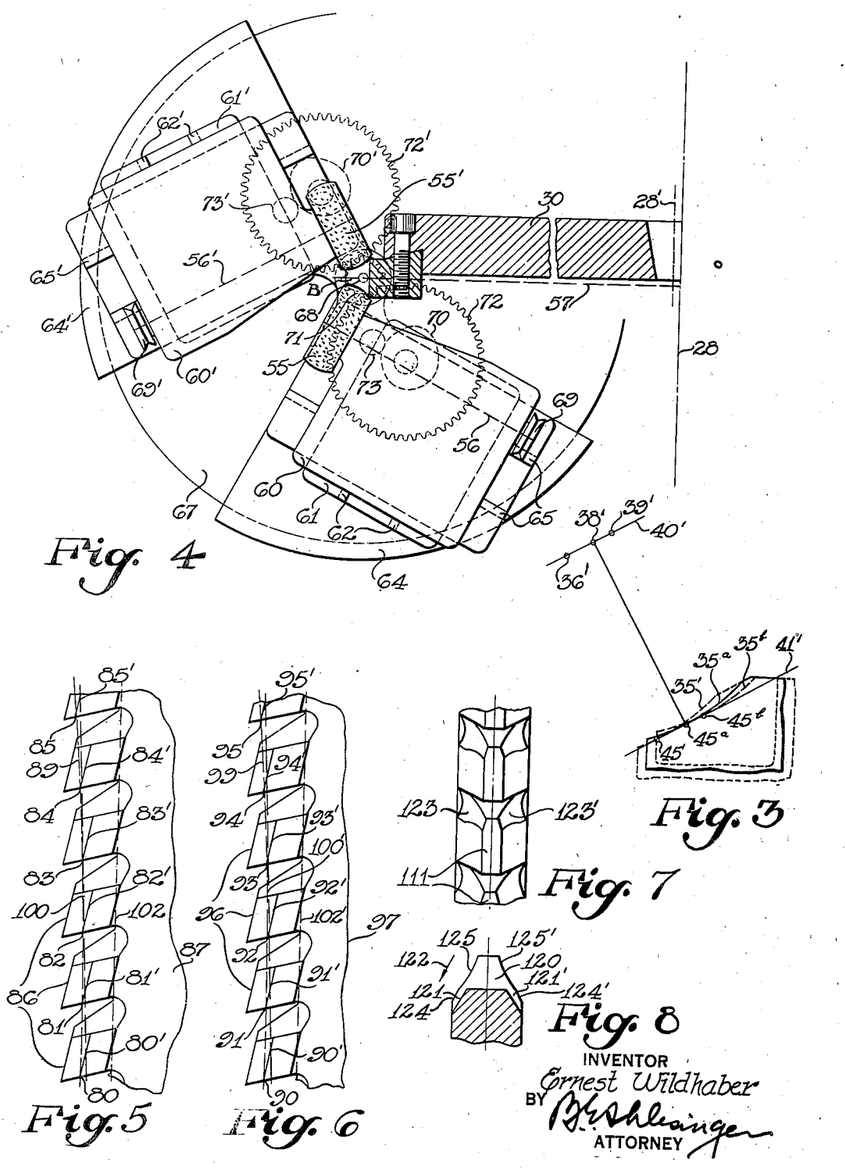

Successive blade profiles are shown superimposed upon one another on a larger scale in Fig. 3. The profiles 35', 35a and 35b, which are illustrated, correspond to equal intervals, that is, profiles 35' and 35b are displaced at equal angles about the axis 28 of the cutter away from the mean profile 35a. It should be noted that the arc center 36' for profile 35' is at a greater distance from the mean arc center 38' of mean profile 35a than the arc center 39' of profile 35b. This indicates that the rate of advance or lead of the profile centers along line 40' increases rapidly with increasing distance of the arc center from the cutter axis. This provides the required taper in width and height from the large to the small ends of the gear teeth which is required in tapered gears as fully described in my prior application.

45', 45a and 45b are, respectively, the points of tangency of the arc profiles 35', 35a and 35b with the basic profile line 41'.

In use, the cutter is rotated continuously in engagement with a gear blank and is simultaneously fed across the face of the gear blank first in one direction and then in the other. The blank is held stationary during cutting and is indexed when the gap in the cutter is abreast of the blank. This principle of gear cutting is fully described in my prior application.

Figure 2:
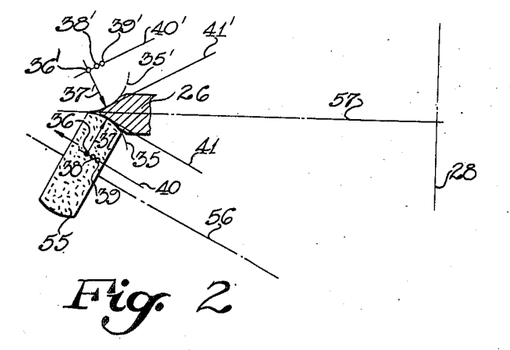
Fig. 2 is a fragmentary sectional view on the line 2—2 of Fig. 1.

The relieved surfaces which we want to produce on the sides of the cutting blades of a cutter such as shown in Figs. 1, 2 and 3 are such as could be enveloped by the relative path of a sphere, which is centered at the arc center 36 or 36', when the cutter is rotated on its axis and relieving motion is produced between the relieving tool and the cutter.

In one embodiment of the invention, the advance of the profile center 36 or 36' parallel to the basic profile line 41 or 41' required on tapered gear cutters is applied intermittently between the relieving of successive blades of the cutter. In this case, the relative motion of the sphere center for any individual blade is composed of a turning motion about the cutter axis and of the straight relieving motion radial of the cutter axis. Both these components and therefore, also, the resultant are in a plane of rotation of the cutter, that is, in a plane perpendicular to the axis of the cutter.

It can be demonstrated mathematically that at any instant a sphere contacts with the surface enveloped thereby in a plane perpendicular to the relative path of the sphere center. In the instance considered, then, the plane of contact between the sphere and the relieved surface is perpendicular to the plane of rotation and parallel to the cutter axis 28 (Fig. 1). It is projected as a straight line 50 whose offset from the cutter axis 28 may readily be determined from the foregoing.

In another and at present preferred embodiment of the invention, the advance of the sphere center 36 or 36' is continuous and goes on during the relieving of the whole cutter and during the relieving of each blade of the cutter. It is timed to the rotation of the cutter. On cutters for cutting tapered gears, this advance usually is at a changing rate for the reasons already indicated. It increases with increasing distance of the sphere center from the cutter axis. The continuous advance theoretically affects the direction of the relative path of the sphere center somewhat in the relieving of each individual blade. The effect of the continuous advance on the blade profile at a given point is, however, so small as to be negligible. For practical purposes, the plane 50 may still be considered, then, as the plane of contact between the sphere and the side surface of the cutter.

The differences between the two embodiments will be described more fully hereinafter. We shall now describe more particularly one way of relief-grinding the sides of the blades according to this invention, whether the advance motion be employed or not and whether that advance motion be intermittent or continuous.

As will be obvious from the preceding description, suitably relieved side surfaces may be obtained by moving a sphere, whose center is at 36 (Fig. 2) toward the cutter in a plane 50 at a uniform rate while the cutter is rotated uniformly on its axis in the direction of the arrow 51 (Fig. 1). In this case, the relieved side surfaces of the blades are ground from the outside in. The direction of the motion may, however, be reversed and the relieved surfaces formed from the inside out.

Inasmuch as the contact between the sphere and a relieved side surface of a blade is in the plane 50, any other surface of revolution which contacts with the sphere along the circular profile 35 or 35' in said plane will do as well as the sphere for imparting the desired relief to the side surfaces of the blades. Thus, for instance, a disc milling cutter or a grinding wheel 55, which has a circular profile centered at 36, may be employed as the relieving tool, when it is so positioned relative to the cutter that its axis 56 lies in the plane 50.

The relieving of the blades is effected, then, by rotating the milling cutter or grinding wheel 55 on its axis 56 while rotating the cutter on its axis 28 and simultaneously effecting a relative reciprocatory movement between the cutter and the wheel 55 in a direction radial of the cutter axis 28.

The relieved surface produced on the side of any blade of the cutter is independent of the diameter of the relieving tool 55 because contact between the relieving tool and the cutter is along the same circular profile at all times regardless of the diameter of the relieving tool. This is the chief merit of the relieving process illustrated in Figs. 1 and 2. It gives the same product as is obtainable with the sphere and most important, it gives the same shape regardless of the diameter of the relieving tool.

This method of grinding spherical relieved surfaces on the sides of cutter blades may be employed even where no advance of the sphere center in the direction of the basic profile is desired or required. In other words, it can be employed for the relieving of cutters for cutting spur gears according to the principles of my prior application and for the relieving of milling cutters generally which have side cutting edges of circular arcuate profile. For the relieving of tapered gear cutters, an intermittent or a continuous relative movement between the relieving tool and the cutter in the direction of the profile tangent is added to the other motions described to effect intermittent or continuous advance of the sphere center, as desired.

When a relieving tool such as illustrated in Figs. 1 and 2 is employed, the wheel axis 56 is offset from the cutter axis 28 in the same direction and by the same amount for the relieving of both sides of the blades, when the cutting profiles of the two sides are symmetrical with respect to the mean cutter plane 57. By positioning the relieving tool in an offset plane identical cutters may be ground at all stages of the life of the grinding wheel. There is, of course a practical limit to the size of the grinding wheel inasmuch as the wheel diameter must not be so large as to interfere with a succeeding blade when it is grinding one blade of the cutter.

The profile of the grinding wheel is preferably so centered that the wheel axis will extend in a direction parallel to the basic profile 41 or 41', that is, in the direction of profile advance. The profile advance may then be obtained, where desired, by effecting relative movement between the grinding wheel and cutter in the direction of the wheel axis.

In Fig. 4, I have illustrated diagrammatically one way in which a machine may be constructed for relieving cutters according to the principles of this invention. Here it is assumed that a profile advance is to be employed in order to produce side surfaces on different blades of the cutters whose centers are displaced from one another. If the advance of the centers of the profiles of successive blades along the basic profile 41 or 41' is slow, two grinding wheels 55 and 55' may simultaneously be employed. The wheels are journaled in slides 60 and 60', respectively, which are mounted on slides 61 and 61', respectively, for adjustment in directions perpendicular, respectively, to the axes 56 and 56', respectively, of the wheels. The adjustment of the slides 60 and 60' upon the slides 61 and 61' may be effected in any usual or suitable manner, as for instance, by means of screws and nuts. Guide-ways 62 and 62', respectively, are formed on the upper faces of the slides 61 and 61' to guide the slides 60 and 60' in their adjustment.

The slides 61 and 61' are mounted on plates 64 and 64', respectively, for adjustment and advance along the wheel axes 56 and 56', respectively. The upper faces of the plates 64 are formed with guide-ways 65 and 65', respectively, for the slides 61 and 61'. The plates 64 and 64' are mounted on a base 67 for angular adjustment about a common pivot 68 which lies in the plane of symmetry 57 of the cutter blades.

The cutter head 30 carrying the blades B to be ground is secured in any suitable manner to the work spindle of the machine and suitable means (not shown) is provided for rotating the cutter on its axis 28 to bring successive blades of the cutter into engagement with the grinding wheels to effect relief of the same. Means is provided for offsetting the cutter axis 28 in a direction perpendicular to the plane of the drawing, in order to effect any desired offset between the cutter axis and the plane of the wheel axes 56 and 56'. This means may be of any usual type and has been omitted from the drawings for the sake of clearness in illustration.

For effecting the relieving of the different blades of the cutter, a motion is produced between the cutter and the grinding wheels in a plane perpendicular to the cutter axis. A cam, such as is ordinarily employed on relieving grinders, may be used for this purpose and the relieving motion may be imparted to the cutter. In this case, the cutter is moved horizontally toward the grinding wheels as each blade passes across the grinding wheels and is then withdrawn quickly to return the cutter to original position ready to begin the relieving of the next succeeding blade. In this relieving movement the cutter axis moves from position 28 to position 28' and back again for each blade of the cutter.

The dressing tools for dressing the grinding wheels may be of any known or suitable design and are omitted in the drawings. The grinding wheels are driven by any suitable means as by V-belts and pulleys 69 and 69', respectively, from motors which may be mounted on the slides 60 and 60', if desired.

The profile advance or lead of the sphere centers for successive blades of the cutter is preferably produced by identical cams 70 and 70' which are driven in time with the cutter rotation. The drive means illustrated comprises a pinion 71 that is mounted in the base of the machine concentric with the pivotal axis 68 and that drives the two spur gears 72 and 72'. The cams 70 and 70' are secured to the shafts on which the spur gears 72 and 72', are mounted so that as the pinion 71 is rotated, the cams 70 and 70' are rotated. The pinion 71 is driven in any suitable manner in time with the cutter rotation. The cams engage rollers or abutment members 73 and 73', respectively, which are carried by the longitudinally movable slides 61 and 61', respectively. The abutment members are so mounted that the high points of the cams produce slide positions further away from the cutter axis 28 than those produced by the low points of the cams. This means, then, that the portions of the cam shapes which produce an increased rate of advance are at points of increased distance from the cam centers. This is convenient especially for lead curves extending over large cam angles. I have found that cam curves of this character may be formed by feeding a milling cutter at a uniform rate in a direction offset from the cam axis. When the change in rate of advance takes place in cam angles smaller than 90°, the cam curve can be made advantageously of eccentric circular portions.

In the operation of relief grinding a cutting blade B of a tapered gear cutter, the cutter is rotated at a uniform rate on its axis 28, the grinding wheels 55 and 55' are rotated on their axes, a relieving movement is produced between the cutter and the grinding wheels in a direction perpendicular to the cutter axis 28 for each blade of the cutter, and simultaneously a slow advance of the grinding wheel is effected by operation of the cams 70 and 70'. The slow advance of the grinding wheel displaces the centers of the spheres represented by the grinding wheels so that successive blades of the cutter are relieved with these centers in different positions. By suitably forming the cams 70 and 70', this advance may be made intermittent, that is, step-by-step after each blade of the cutter is ground or may be made continuous. As already stated, the latter is preferred.

The two different forms of cutter are illustrated in Figs. 5 and 6. Fig. 5 illustrates a cutter which is formed with a continuous profile advance, while the cutter shown in Fig. 6 is formed with an intermittent profile advance applied during the return stroke of the relieving motion. In Fig. 5, the points of tangency of the cutting profiles of the successive blades 86 with the basic profile are denoted at 80, 81, 82, etc., to 85. The corresponding points of tangency of the blades 96 of the cutter 97 shown in Fig. 6 are denoted at 90, 91, etc., to 95. These points are identically located in both cutters and are disposed on curved lines 89 and 99, respectively, whose tangents at the mean points 83 and 93, respectively, are denoted at 100 and 100', respectively. The curved lines containing the points 80 to 85 inclusive and 90 to 95 inclusive, respectively, depart at both ends from the mean tangents 100 and 100', respectively. Each has an increasing inclination to the lines 102 and 102', respectively, which denote the peripheral directions of the two cutters and the inclination increases from the point 80 to the point 85 or from the point 90 to the point 95 as the case may be.

In the cutter illustrated in Fig. 6, the lines 90', 91', 92', 93', 94', and 95', which denote the directions of relief on the sides of the blades and which pass through the points 90 to 95 inclusive, are obtained solely through a combination of the relieving motion and the rotation of the cutter and all of these lines have the same inclination or substantially the same inclination to the peripheral direction 102'. In the embodiment of the invention illustrated in Fig. 5, however, the relieved lines 80' to 85' inclusive contain the added component of the continuous profile advance. That inclination equals the substantially constant inclination of the relief lines of Fig. 8 plus or minus the varying inclination of the line 89.

This changing inclination at points in the line 89 becomes larger in going from the point 80 to the point 85, which in a cutter for cutting a tapered gear corresponds to the direction from the large to the small end of the gear tooth. Therefore, the inclination of the individual relief lines 80', 81', etc., to the peripheral direction 102 also changes and grows smaller from the point 80 to the point 85. In Figs. 5 and 6, the relief lines contain the points of tangency of the cutting edges, which are formed on the blades by successive sharpenings, with the respective basic cutter profiles.

Figure 12:
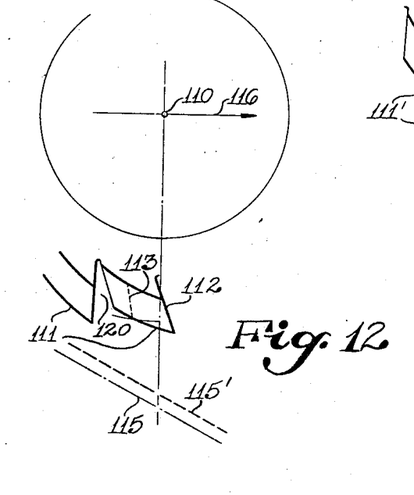
Figs. 12 and 13 illustrate diagrammatically one difference between the two cutters shown in Figs. 5 and 6 and how these cutters must be adjusted differently relative to the gear blank to be cut, after they have been sharpened.
Figure 13:
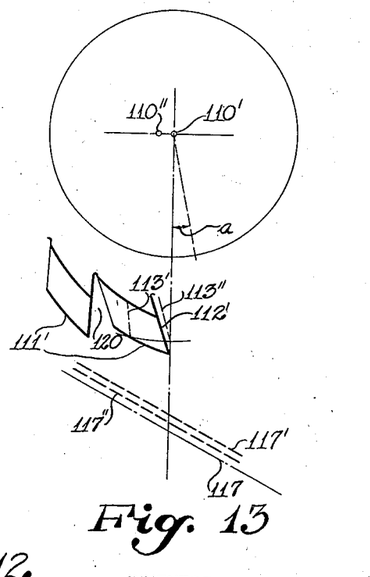

Figs. 12 and 13 illustrate differences, in use, between cutters formed according to Figs. 5 and 6, respectively. The cutter axes in the two figures are denoted at 110 and 110', respectively. Two blades of each cutter only are shown, the blades being designated at 111 in Fig. 12 and at 111' in Fig. 13. In the two figures, 112 and 112' denote, respectively, initial cutting faces of a blade of the cutter and 113 and 113' denote, respectively, the positions of these cutting faces after the blades have been repeatedly sharpened.

In the cutter of Fig. 12, which has been relieved with a continuous profile advance according to the principles described with reference to the cutter of Fig. 5, an adjustment for depth only is required after sharpening. The gear blank axis 115, whose position corresponds to the initial cutting space 112 is merely adjusted, after the cutter has been sharpened, toward the cutter to a position 115' to correspond to the new cutting face 113. Adjustment may be in a direction perpendicular to the direction 116 of feed movement of the cutter across the face of the blank, like the adjustment of a blank relative to a conventional milling cutter after sharpening.

With the cutter illustrated in Fig. 13, however, adjustment of the blank toward the cutter is not enough. The cutter should, also, be turned on its axis 110' until the new cutting edge 113' is in the same position of action as the old cutting edge 112 which it duplicates. The cutting face 113' then assumes the position 113". The adjustment, after sharpening, of the cutter illustrated in Figs. 6 and 13 may therefore consist of a radial adjustment of the work so that the work axis is displaced from the position 117 to the position 117' and of a cutter rotation through an angle $a$ without any change in position of the cutter longitudinally of the gear blank.

When the cutter of Fig. 13 is so formed that the roughing edges will leave ample stock on the sides of tooth spaces of the gear blank to be removed by the finishing edges, or when finishing edges only are provided in the cutter, a linear adjustment may be substituted for the angular adjustment $a$. The original timed relationship between the cutter and the longitudinal feed movement across the face of the gear blank is then maintained and as the cutter is turned through the angle $a$, the cutter center is moved relative to the gear blank to the position 110". Compensation for the change in linear position of the cutter center is effected by displacing the work laterally the same distance 110'—110", so that the work axis 117 is moved from position 117' to position 117".

In either case, the novel cutter illustrated in Figs. 5 and 12 requires fewer changes in setting, after sharpening, than the cutter of Figs. 6 and 13.

In both cases, the cutters may contain V-shaped gashes 120 which are uniformly spaced and all at the same distance from the cutter axis. The gashes are deep enough to extend through the whole depth of the cutting profile of a new cutter, which, therefore, can be sharpened easily in the conventional manner. For reasons of strength, the gashes in a new cutter are made only to this required whole depth, that is, the front faces of the cutting teeth have only this depth. As the cutter is sharpened, then, the required depth from the top of the cutting tooth to the bottom of the cutting profile is maintained by properly positioning the sharpening wheel.

The gashes may be supplemented with grooves 121 and 121' (Fig. 8) which are milled in the directions of the profile tangents, the direction of one of which is denoted at 122, or with circular grooves such as may be obtained by rotating milling cutters about fixed axes inclined to the cutter axis in the directions of the profile tangents. In both of these cases, the same operation which is employed to produce the grooves 121 and 121' may also be used to apply a second, namely increased, relief at the rear ends of the blades as indicated at 123 and 123' in Fig. 7. These side relieved surfaces 123 and 123', may be milled with a milling cutter which is substantially cylindrical and which is rotated in engagement with the blade without relieving motion and with its axis substantially perpendicular to the plane 50 of Fig. 1. The radius of said milling cutter is equal to the profile radius 37 or 37' (Fig. 2) of the relieved side surface. To produce the supplemental relieved surfaces on the rear sides of different blades of a tapered gear cutter, different positions of the milling cutter axis are required for successive blades, corresponding to the advance of the center of curvature of the different blades, as will readily be understood.

Where the relieving process of the present invention is applied in the relief milling of the blades of a cutter before hardening, the supplemental relief at the backs of the cutting blades may be applied in the same operation as the first or main relief by employing a suitable shape on the cam which controls the main relieving motion. In this case, it is often unnecessary to provide supplemental side slots such as indicated at 121 and 121' (Fig. 8).

Instead of making the cutting profiles of the blades completely circular from top to bottom, they may also be made with straight portions 124 and 124' (Fig. 8) at the inner (lower) ends of the curved profiles (125 and 125' of the blades, at least on those blades which are intended to cut at the small ends of the tapered gear teeth where the required cutting depth is less and a continuation of curved profiles 125 and 125' is unnecessary. The straight portions 124 and 124' of the cutting profiles lie in conical surfaces concentric with the cutter axis and may be made parallel to the basic cutting profiles 41 and 41' (Fig. 2). When the cutter is constructed in this way, the danger of interference, during the relief grinding operation, of the grinding wheel with a succeeding blade, is reduced and the sides of the cutting blades can be relieved back from their front faces to a greater extent so that the blades will have longer life. The straight portions 124 and 124' may be formed on the opposite sides of the blades simultaneously with the formation of the grooves 121 and 121'.

Thus far, I have described only a cutter in which two opposite side cutting edges are formed on each blade by sharpening the front faces of each blade in a plane parallel to the cutter axis. It is to be understood, however, that the invention is applicable likewise where the blades are sharpened so that alternate blades are formed with opposite side cutting edges or where other known arrangements of the cutting edges are employed.

Figures 9, 10:
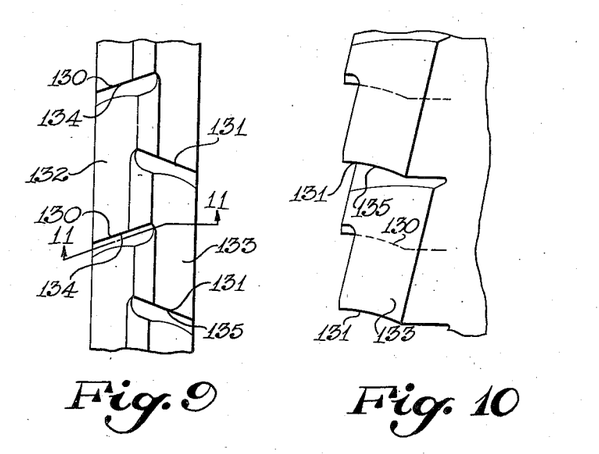
Figs. 9 and 10 are a fragmentary plan view and a fragmentary developed view, respectively, of a cutter made according to a still further embodiment of the invention.
Figure 11:
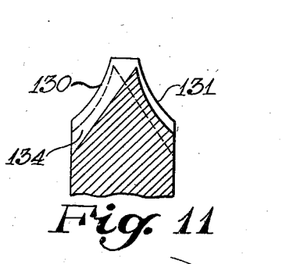
Fig. 11 is a sectional view on the line 11—11 of Fig. 9.

In Figs. 9 to 11 inclusive, I have illustrated a form of cutter in which staggered side cutting edges 130 and 131 are formed on the relieved opposite side surfaces 132 and 133, respectively, by plane cutting faces 134 and 135 that are inclined at acute angles to the side surfaces 132 and 133, respectively. In the embodiment illustrated, the front faces 134 and 135 are of substantially uniform depth from the top to the bottom of the cutting portion of the blades, that is, they follow the general directions of the opposite side cutting edges 130 and 131, respectively, as clearly illustrated in Fig. 11. They do not extend through the cutting portions of the cutter but each leaves the opposite relieved side surface of the cutter intact. Each relieved side surface 132 or 133, therefore, may extend beyond the opposite cutting face 135 or 134. Hence the cutter will have as much life as if the gashes were not staggered. A cutter formed according to the embodiment illustrated in Figs. 9 to 11 inclusive, then, has as much life as the cutter shown in Figs. 5 and 6, but has the advantage that it will cut on opposite sides of a tooth space of a gear blank alternately and opposite sides of the tooth spaces will not be engaged simultaneously. The load on the cutter at any moment, then, will be reduced and because of the acute angle cutting edges, also, the cutter will cut more smoothly.

Figures 14, 16:
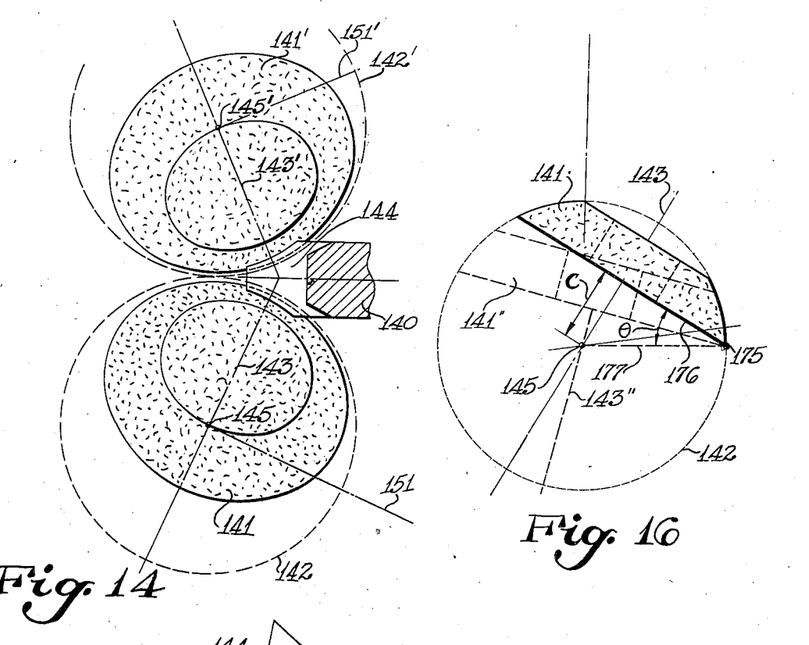
Figs. 14 and 15 are a fragmentary sectional view and a fragmentary side elevation, respectively, illustrating diagrammatically the method of relieving cutter blades according to a modification of the invention.
Fig. 16 is a diagrammatic view showing how the grinding wheel, which is employed in the method illustrated in Figs. 14 and 15, may be adjusted, after dressing, so as to grind the same surface throughout the whole of its life.
Figure 15:
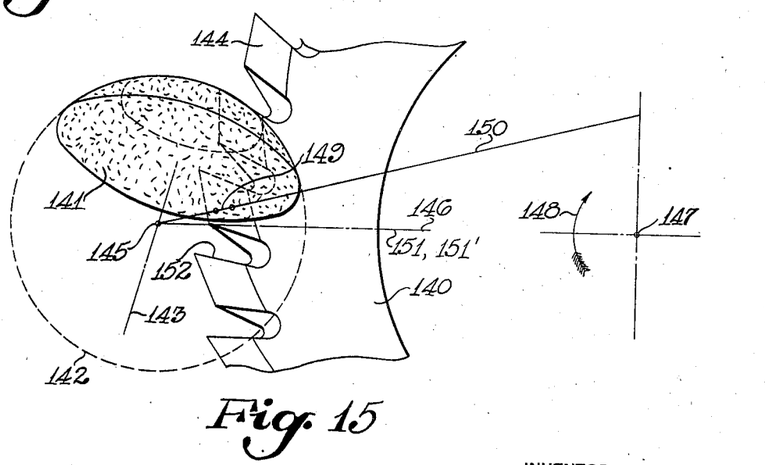

A modified method for relieving cutters according to this invention is illustrated in Figs. 14 to 16 inclusive. This method applies to the relieving of any milling cutter, as long as the cutting edges of the cutter are concave arcs or more broadly, as long as the cutters have relieved side surfaces which can be enveloped by a sphere. This embodiment of the invention will be described without reference to any advance of the sphere center, that is, it will be described with reference to the relieving of cutters whose corresponding side cutting edges have centers of curvature that remain at a uniform distance from the cutter axis. Cutters of this type are employed in the cutting of spur gears, according to the principles of my prior application, are employed for roughing both spur and bevel gears, etc. It will be understood, however, that the profile advance may be added, also, where desired as, for instance, in the relieving of cutters intended for the cutting of tapered gears.

In Figs. 14 and 15, the cutter to be relieved is denoted at 140 and the grinding wheels for relieving the opposite side surfaces of the blades 144 of the cutter are denoted at 141 and 141'. The grinding wheels are provided with spherical active surfaces and directly embody the spheres 142 and 142' which envelop the relieved side surfaces of the blades during the relieving of the same. In the illustrated embodiment, the sphere centers 145 and 145' lie in the same horizontal plane 146 (Fig. 15) with the axis 147 of the cutter. The relieving operation is effected, as before, by rotation of the cutter on its axis and relative relieving movement between the grinding wheel and the cutter radially of the cutter axis as each blade of the cutter passes over the grinding wheel. The relieving motion consists of radial movement along the line 145—147 toward the cutter axis 147 when the cutter rotation is in the direction of the arrow 148. The relieving motion is in the opposite direction when the cutter rotates in the opposite direction.

In this embodiment of my invention, it is unnecessary to adjust the grinding wheel so that the sphere center 145 or 145' will be offset from the cutter axis 147, as is the case in the embodiment of the invention illustrated in Figs. 1 and 2. This is so even though the line of grinding contact 149 still remains in a plane 150 offset from the cutter axis 147. The on-center positioning of the sphere centers is possible because in the embodiment of the invention shown in Figs. 14 and 15, the grinding wheels have truly spherical operating surfaces and the spheres represented by the grinding wheels will generate relieved side surfaces with the same curvature at all times regardless of whether the sphere centers 145 and 145' are set on or off center with reference to the axis of the cutter. It may even be desirable to use a relieving motion such that the sphere centers will move in a direction more nearly parallel to the front face 152 of a blade in order thereby to increase the inclination of the grinding line 149 to the periphery of the grinding wheel. That is, the relieving motion may be effected in a direction non-radial of the cutter axis 147 and more nearly parallel to the front face 152 of a blade.

The grinding wheels are, as indicated, positioned so as to have their peripheries extend in the general direction of the blade height. They are mounted to be axially adjustable and they may also be mounted to be tilted to any desired inclination about axes 151 and 151', here shown horizontal. The axes 151 and 151' and the wheel axes 143 and 143', respectively, are disposed at right angles to one another. If profile advance is used, for the purpose of disposing the centers of different blades at different radial distances from the axis of the cutter as is required for a tapered gear cutter, it is preferably in the direction of the axes 151 and 151'.

Figures 17, 18, 19, 20:
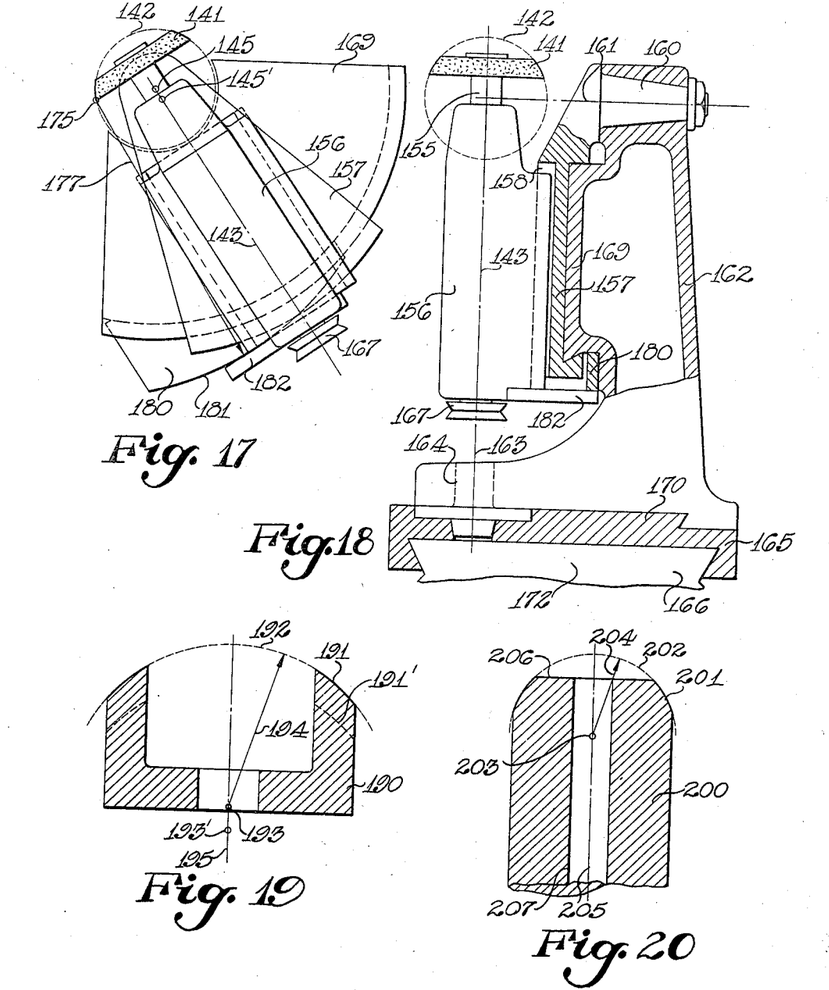
Figs. 17 and 18 are a plan view and a side elevation, respectively, with parts broken away, illustrating one means for mounting and adjusting the grinding wheel shown in Figs. 14 to 16 inclusive.
Figs. 19 and 20 are sectional views illustrating, respectively, two other forms of grinding wheels which may be employed in practicing the present invention according to the embodiment illustrated in Figs. 14 to 16 inclusive.

Figs. 17 and 18 illustrate one way in which each grinding wheel 141 or 141' may be mounted and adjusted. The mounting for only one of the wheels is shown, but it is to be understood that the mounting for the other wheel may be identical with that shown. The grinding wheel 141 is secured to a spindle 155 which is suitably journaled in a head 156. The head 156 is mounted on a plate 157 for adjustment in the direction of the wheel axis 143 and is guided in this adjustment by ways 158 formed on the outside face of the plate 157. The plate 157 is formed with a trunnion 160 and is adjustable about the axis 161 of this trunnion. The trunnion 160 is journaled in an upright 162 which is angularly adjustable about the axis 163 of a trunnion 164. The axes 161 and 163 extend at right angles to one another. The trunnion 164 is secured to a slide 165 that is mounted on the base 166 for movement in the direction of the axis of the cutter which is to be relieved.

Each grinding wheel may be driven with a V-belt and a pulley 167 from a motor which is not shown and which may be mounted on the head 156 if desired. The plate 157 is adjustable on an arcuate guide surface 169 of the upright 162. The upright 162 is adjustable upon an arcuate guide surface 170 of the slide 165 and the slide 165 moves on a suitably shaped way 172 of the base 166.

The relieving motion may be imparted to the cutter and may be produced by a relieving cam in the usual manner. The mounting of the cutter is not illustrated because it may follow known practice, but the cutter is adjustable radially to bring it into operative relation with the grinding wheels.

Fig. 16 illustrates diagrammatically how the grinding wheel 141 or 141' may embody the same sphere throughout its useful life even after its general diameter is reduced by successive dressings. The active profile portion of the wheel is an arc extending upwardly from the point 175 and the spherical grinding surface of the wheel 141 contains said portion. The initial shape and position of the grinding wheel is shown in dotted lines at 141" and the shape and position of the grinding wheel after repeated dressings is indicated in full lines at 141. The axis of the wheel, when new, is at 143". It is seen that as the diameter of the wheel decreases, the axis is tilted from the position 143" to the position 143 and that, moreover, the axial position of the wheel is changed. To avoid any interference of the grinding wheel with the blade succeeding that which is being ground, it is desirable at all times to maintain the general direction and position of the rim or back-face 176 of the grinding wheel constant at the zone of grinding engagement. Hence, the rim 176 should pass through point 175 at all times. This gives us the following relationship between the axial distance C of the rim 176 from the sphere center 145, sphere radius $r = 175-145$, and angle $\theta$ which is the angle between the sphere radius 177 and the rim 176 of the grinding wheel, viz:

$$C = r.\sin \theta$$

In Figs. 17 and 18, there is shown a practical way for corelating the cutter tilt and the axial position ($C=r.\sin\theta$) of the cutter. A stationary partial eccentric 180 is so mounted on the upright 162 that the center of its circular outline 181 coincides with the point 175 (Figs. 17 and 16) through which the rim or back-face 176 should pass for all tilt angles $\theta$. A plane or flat abutment 182 (Figs. 17 and 18), which is secured to the sliding head 156, is maintained in engagement with the operative surface 181 of the eccentric 180. The distance of the abutment plane from the sphere center is then seen to equal the radial distance 177 minus $r.\sin\theta$ since the abutment plane is perpendicular to the wheel axis 143. The distance C of the rim plane 176 of the grinding wheel from the sphere center 145, then, is equal to $r \sin\theta$, as required.

In dressing the grinding wheel, then, the angle of the wheel axis may be first increased and the axial slide 156 then advanced until the abutment 182 again engages the eccentric surface 181. The plate 157 and the head 156 are then secured in position and the grinding wheel is dressed. In a modified procedure, the wheel is first dressed from a sphere center at 145' (Fig. 17) a known distance back of the operating sphere center position 145 and the wheel angle is then increased while maintaining the abutment 182 in contact with the eccentric surface 181 until the sliding head 156 has been advanced the distance 145'—145. Then the parts are again locked in position.

Other forms of spherical grinding wheels or milling cutters, which may be employed in practicing the present invention, are illustrated in Figs. 19 and 20. In Fig. 19, a cupped grinding wheel 190 is shown whose grinding surface 191 is a portion of a sphere 192 that is centered at 193 and that has a radius 194. The wheel axis is denoted at 195. In use, the wheel axis 195 remains in the same setting position without change of its tilt. The wheel is simply adjusted axially and then dressed. 191' denotes the position of the operative grinding face of the wheel after several dressings. The surface 191' is a spherical surface whose center is at 193', so that when the wheel is advanced axially by the distance 193'—193, the wheel continues to grind the same spherical surface 192.

Fig. 20 illustrates a grinding wheel in the general form of a pencil wheel but much stronger. The grinding profile 201 of this wheel 200 is a portion of a sphere 202 whose center is at 203 and whose radius is denoted at 204. The axis of the grinding wheel is designated at 205. This wheel also is adjusted only axially for dressing. The plane front face 206 of this wheel is dressed in addition to its spherical surface 201. A cylindrical hole 207 may be provided in the wheel to reduce the amount of surface to be dressed and thereby facilitates the dressing of the front face of the wheel. The radius of the hole is preferably, however, kept smaller than the width 206 of the front surface.

Wheels which are adjusted axially for dressing, such as the wheels of Figs. 19 and 20, may always maintain their diameter constant and therefore produce relieved side surfaces of constant curvature at all stages of the useful life of the wheels. This is true even in cases when the grinding surface is not a sphere. The precautions regarding proper offset of the grinding wheel, which must be observed with wheels such as shown in Figs. 1, 2 and 4 are, therefore, unnecessary with the axially adjustable wheels. It should, therefore, be clearly understood that I may also use axially adjustable wheels of other shapes for grinding the side surfaces of blades of cutters. Thus it is to be understood that it is within the contemplation of my invention to use wheels having tapered grinding surfaces such as conical and approximately conical surfaces. Such wheels may have the same circular outline as a spherical wheel.

Figure 21:
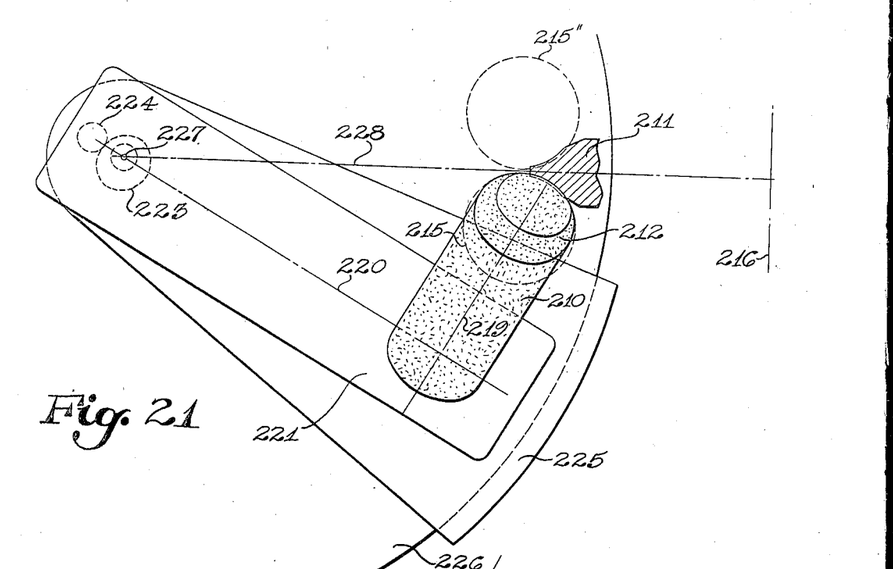
Figs. 21 and 22 are fragmentary plan and side elevational views, respectively, illustrating the method of relief grinding a cutter with a pencil-wheel according to a still further embodiment of the invention.
Figure 22:
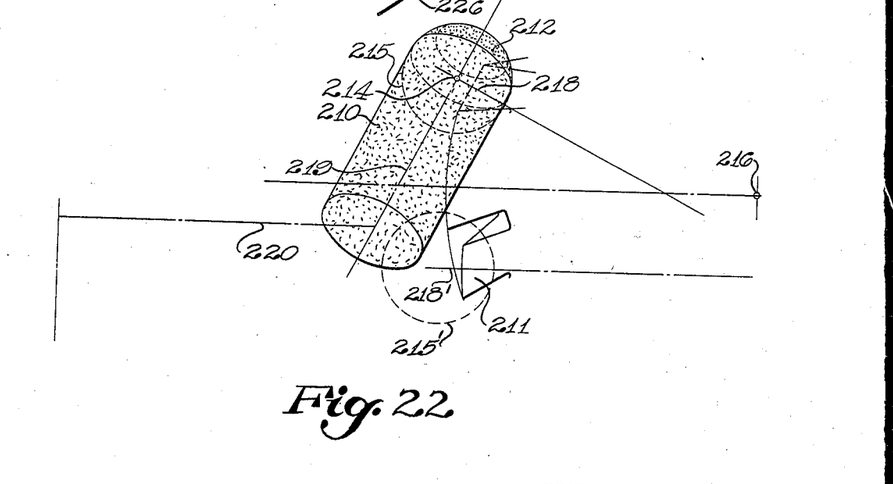

In Figs. 21 and 22, I have illustrated an arrangement for relief grinding the side surfaces of blades of a cutter with a pencil wheel or rod wheel. The grinding wheel is denoted at 210 and the blades to be ground at 211. The grinding wheel is provided with a spherical operating surface 212 whose center is at 214. The complete sphere is indicated by the circle 215. The sphere 215 swept out by the active surface 212 of the grinding wheel contacts with the relieved side surface of a blade enveloped thereby in a great circle whose plane is perpendicular to the relative path of the sphere center in the relieving motion, as has already been explained. The line of instantaneous contact between the sphere surface and the side of the cutting blade is shown in grinding position at 218 in Fig. 22 and in horizontal position at 218'. The position of the sphere, when the grinding line is at 218', is denoted at 215'.

The axis of the cutter is denoted at 216. In the drawings the distance of the axis 216 from the cutting blades 211 is smaller than would actually be the case.

In use, the grinding wheel 210 is rotatably mounted on a sleeve or slide (not shown) which is adjustable in the direction of the wheel axis 219 independently of any adjustment that may be provided on the wheel dressing tool. The wheel is also mounted for angular adjustment about an axis 220 and may be tilted about this axis by known means not shown. This adjustment is determined by the clearance angle desired on the relieved side surfaces of the blades. The grinding wheel unit is also mounted on a slide 221 which is adjustable as well as movable in a direction parallel to the axis 220. Profile advance along said axis may be effected by a cam 223 which engages an abutment 224 that is secured to the slide 221. The slide reciprocates for the advancing motion on a sector 225 which is mounted on a base 226 for angular adjustment thereon about the axis 227 of the cam 223. Said axis is disposed in the plane of symmetry 228 of the cutter 211.

The cutter itself may be adjusted in a direction perpendicular to its axis 218 so that the cutter axis may be set at any suitable distance from the axis 227 of the cam. The relieving motion may be imparted either to the cutter or to the grinding wheel. For relieving, the cutter is rotated on its axis, the grinding wheel is rotated on its axis in engagement with the cutter, a reciprocatory relieving motion is imparted between cutter and grinding wheel in a direction perpendicular to the cutter axis 216 once for each blade to be relieved and the profile advance is imparted to the grinding wheel through operation of the cam 223 and slide 221.

The described arrangement permits grinding the two sides of the cutter in succession by changing three settings, namely, by tilting the grinding wheel 210 about axis 220 to an equal but opposite angle, by adjusting the angularity of axis 220 to a position symmetrical with respect to plane 228 by angular adjustment of the sector 225, and by a rotational adjustment of the cam 223, as by means of a clutch, so that the position of the cam will correspond to the change in direction of the axis 220. In view of the symmetrical design of the grinding apparatus, no other changes are required. The position of the sphere represented by the active surface of the grinding wheel, after the adjustments described have been made, is denoted at 215'' in Fig. 21.

In the above description, I referred only to the grinding of the side surfaces of blades of a cutter. The top surfaces of the blades may be ground in any suitable manner by known means.

The side surfaces of blades of a cutter, which are ground according to the present invention with a spherical wheel or with a wheel whose active surface represents a sphere, are spherical Archimedean surfaces if the sphere center moves relatively during the relieving motion in a plane perpendicular to the cutter axis and in a line intersecting the cutter axis, providing that no profile advance or only intermittent profile advance is employed. If continuous profile advance is employed, the relieved side surfaces become spherical conical-helical surfaces. Where the sphere center moves relatively in an offset plane, as in the embodiment of Figs. 1 and 2, the relieved side surfaces are spherical surfaces of involute form, if no profile advance or only intermittent profile advance is employed. If continuous profile advance is used, the relieved side surfaces are spherical hyperboloidal-helical surfaces.

While several different embodiments of the invention have been illustrated, it will be understood that the invention is capable of various further modifications and the present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the limits of the appended claims.

Having thus described my invention, what I claim is:

1. The method of relieving the side surfaces of blades of a disc-type gear cutter which comprises engaging a relieving tool, which has an active surface of curved profile, with the cutter and rotating the cutter on its axis while effecting a relative reciprocatory motion between the tool and cutter once for each blade of the cutter to be relieved and displacing the tool relative to the cutter, during rotation of the cutter, in a direction inclined to the plane of rotation of the cutter.

2. The method of relieving the side surfaces of blades of a disc-type gear cutter which comprises engaging a relieving tool, which has an active surface of curved profile, with the cutter and rotating the cutter at a uniform velocity on its axis while effecting a relative reciprocatory movement between the tool and cutter once for each blade of the cutter to be relieved, and continuously displacing the tool relative to the cutter at a non-uniform velocity, during rotation of the cutter, in a direction inclined to the plane of rotation of the cutter so that successive blades of the cutter are relieved with the tool in different positions.

3. The method of relieving the side surfaces of blades of a disc-type gear cutter which comprises engaging a rotary grinding wheel, which has an active surface of circular arcuate profile in an axial plane, with the cutter, rotating the wheel on its axis, rotating the cutter on its axis, effecting a relative reciprocatory movement between the wheel and cutter in a direction perpendicular to the cutter axis once for each blade of the cutter to be relieved, and displacing the wheel relative to the cutter in a direction inclined at other than right angles to the plane of rotation of the cutter, between relieving of different blades of the cutter, so that different blades of the cutter are relieved with the wheel in different relative positions.

4. The method of relieving the side surfaces of blades of a disc-type gear cutter which comprises engaging a rotary grinding wheel, which has an active surface of circular arcuate profile in an axial plane, with the cutter, rotating the wheel on its axis at a uniform velocity, rotating the cutter on its axis at a uniform velocity, effecting a relative reciprocatory movement between the wheel and cutter in a direction perpendicular to the cutter axis once for each blade of the cutter to be relieved, and continuously displacing the wheel relative to the cutter, during rotation of the cutter, at a varying velocity in a direction inclined to the plane of rotation of the cutter so that successive blades of the cutter are relieved with the wheel in different positions.

5. The method of relieving the side surfaces of blades of a disc-type gear cutter which comprises employing a rotary tool, which has an active surface of circular arcuate profile, whose center is on the axis of the tool, rotating the tool on its axis, rotating the cutter on its axis and effecting a relative reciprocatory movement between the tool and cutter in a plane radial of the cutter axis for each blade of the cutter to be relieved and simultaneously effecting a step-by-step displacement of the center for different blades of the cutter in a direction inclined at other than right angles to a plane of rotation of the cutter.

6. The method of relieving the side surfaces of blades of a disc-type gear cutter which comprises employing a rotary grinding wheel, which has an active surface of circular arcuate profile in an axial plane, positioning said wheel in engagement with the cutter so that its axis lies in a plane offset from the axis of the cutter and tangent to a circle circumscribed about the axis of the cutter, and rotating the wheel on its axis while rotating the cutter on its axis and effecting a relative reciprocatory movement between the wheel and cutter in a plane radial of the cutter axis once for each blade of the cutter and simultaneously displacing the wheel relative to the cutter in time with the cutter rotation in a direction inclined at other than right angles to the axis of the cutter.

7. The method of relieving the side surfaces of blades of a disc-type gear cutter which comprises employing a rotary grinding wheel, which has an active surface of circular arcuate profile in an axial plane, positioning said wheel in engagement with the cutter so that the axis of the wheel is inclined to cutter axis and lies in a plane offset from the axis of the cutter and tangent to a circle circumscribed about the axis of the cutter and extends parallel to a tangent to the profile of a blade of the cutter, and rotating the wheel on its axis while rotating the cutter on its axis and effecting a relative reciprocatory movement between the wheel and cutter in a plane radial of the cutter axis once for each blade of the cutter and displacing the wheel in the direction of its axis between grinding of different blades of the cutter so that different blades of the cutter are relieved with the wheel in different axial positions.

8. The method of relieving the side surfaces of blades of a disc-type gear cutter which comprises employing a rotary grinding wheel, which has an active surface of circular arcuate profile in an axial plane, positioning said wheel in engagement with the cutter so that the axis of the wheel is inclined at other than right angles to the axis of the cutter and lies in a plane offset from the axis of the cutter and tangent to a circle circumscribed about the axis of the cutter, and rotating the wheel on its axis while rotating the cutter on its axis and effecting a relative reciprocatory movement between the wheel and cutter in a plane radial of the cutter axis once for each blade of the cutter, and moving the wheel continuously in the direction of its axis at a varying velocity in time with the cutter rotation.

9. The method of relieving blades of a disc-type cutter which comprises employing a grinding wheel whose active surface is a portion of a spherical surface whose center lies on the axis of said wheel, positioning said wheel so that its circumference at the area of its contact with a blade of the cutter extends in the direction of the height of the profile of the blade, rotating the wheel on its axis, rotating the cutter on its axis and effecting a relative reciprocatory movement between the wheel and cutter in a direction perpendicular to the axis of the cutter once for each blade of the cutter.

10. The method of relieving blades of a disc-type cutter which comprises employing a grinding wheel whose active surface is a portion of a spherical surface whose center lies on the axis of said wheel, positioning said wheel so that the center of the sphere lies on a line radial of the cutter axis, rotating the wheel on its axis and rotating the cutter on its axis while effecting a relative reciprocatory movement between the wheel and cutter in the direction of said line once for each blade to be relieved and displacing the wheel relative to the cutter in time with the cutter rotation in a direction perpendicular to the axis of the wheel.

11. The method of relieving side surfaces of blades of a disc-type cutter which comprises employing a pencil grinding wheel having an active surface which is a surface of revolution, engaging said surface with a side of a blade of the cutter so that the circumference of the wheel at the area of its contact with the said side of said blade extends in the direction of the height of the profile of the said side of the blade, rotating the wheel on its axis, while rotating the cutter on its axis and imparting a relative reciprocatory movement between the wheel and cutter in a plane radial of the cutter axis once for each blade of the cutter to be relieved, and simultaneously displacing the wheel relative to the cutter in a direction parallel to a tangent to the blade profile and inclined at other than right angles to a plane of rotation of the cutter.

12. The method of relieving the side surfaces of the blades of a disc type gear cutter which comprises mounting a rotary relieving tool, which has an active surface of curved profile in an axial plane, in engagement with a side surface of a blade of the cutter, rotating the tool on its axis, rotating the cutter on its axis while simultaneously producing a relative reciprocatory movement between the tool and cutter in a direction inclined to the cutter axis once for each blade to be relieved, and effecting a relative displacement between the tool and cutter, during rotation of the cutter, at a variable rate in a direction generally parallel to a tangent to the blade surface of the cutter.

13. The method of relieving the side surfaces of blades of a disc type gear cutter which comprises mounting a rotary tool, which has an active surface of spherical shape, in engagement with the cutter, rotating the tool and cutter on their respective axes while producing a relative reciprocatory movement between the cutter and tool once for each blade to be relieved, and effecting a further movement of displacement between the cutter and tool, during rotation of the cutter, in a direction inclined at other than right angles to the axis of the cutter.

14. The method of relieving the side surfaces of the blades of a disc type gear cutter which comprises mounting a rotary tool, which has an active surface of spherical shape, in engagement with the cutter, rotating the tool and cutter on their respective axes while producing a relative reciprocatory movement between the tool and cutter in time with the cutter rotation once for each blade to be relieved, and effecting a further continuous movement of displacement at a variable rate between the tool and cutter, during rotation of the cutter and in time therewith, in a direction inclined at other than right angles to the axis of the cutter.

15. The method of relieving the side surfaces of blades of a disc type gear cutter which comprises mounting a rotary tool, which has an active surface of circular arcuate profile in an axial plane, in engagement with the cutter so that the periphery of the tool extends in the direction of the height of a blade of the cutter, rotating the tool and cutter on their respective axes while producing a relative reciprocatory movement between the tool and cutter once for each blade to be relieved, and simultaneously producing a further movement of displacement between the tool and cutter, during rotation of the cutter, at a variable rate and in a direction inclined at other than right angles to the axis of the cutter.

16. The method of relieving the side surfaces of blades of a disc type gear cutter which comprises mounting a rotary tool, which is of curved profile in an axial plane, in engagement with a cutter so that the axis of the tool is inclined at other than right angles to the axis of the cutter, rotating the tool and cutter on their respective axes, and producing a relative movement between the tool and cutter in time with the cutter rotation as each blade passes under the tool, and effecting a continuous added relative movement between the tool and cutter at a varying rate, during rotation of the cutter, in the direction of the tool axis.

ERNEST WILDHABER.